Oct. 6, 1942.　　　　G. C. ARMSTRONG　　　　2,298,189
ELECTRIC MOTOR
Filed July 19, 1940　　　2 Sheets-Sheet 1
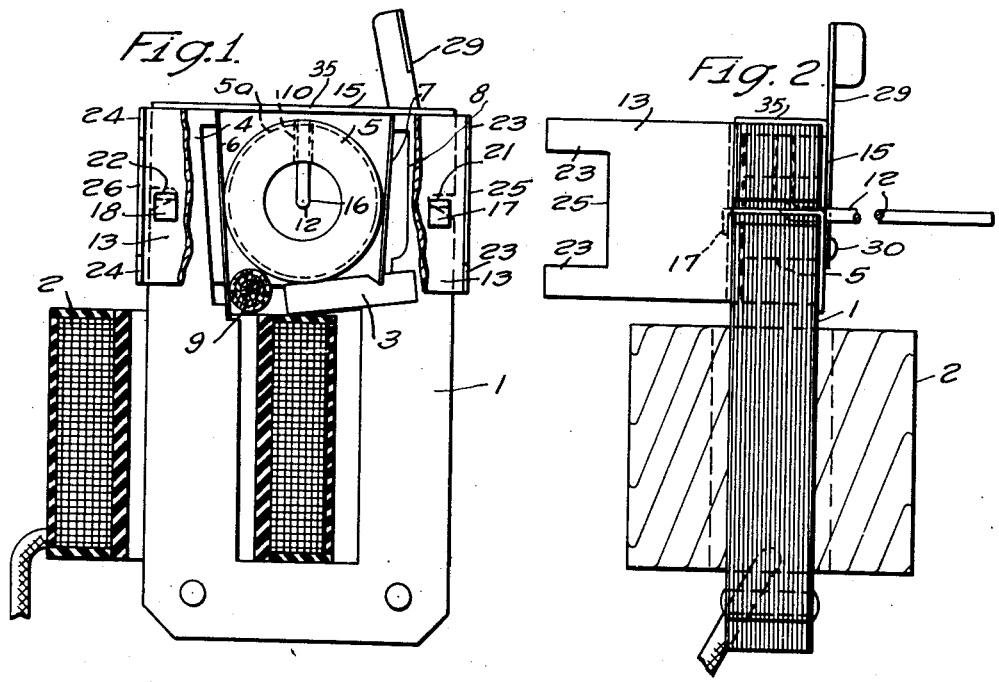
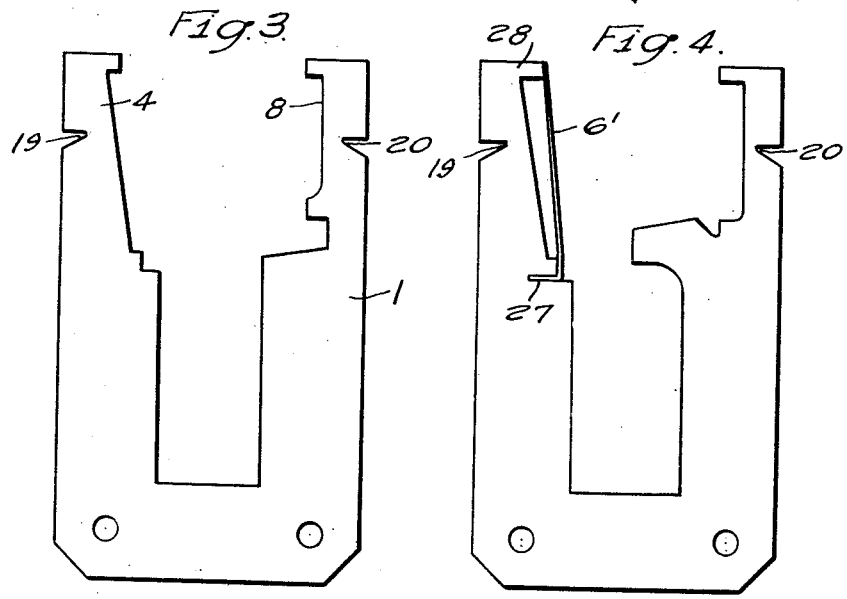
WITNESSES:
E. A. McCloskey
Wm. J. Ruano
INVENTOR
George C. Armstrong
BY
Paul E. Friedemann
ATTORNEY Oct. 6, 1942.  G. C. ARMSTRONG  2,298,189
ELECTRIC MOTOR
Filed July 19, 1940  2 Sheets-Sheet 2

WITNESSES:
E. A. McCloskey
Wm. J. Ruano

INVENTOR
George C. Armstrong.
BY
Paul E. Friedemann
ATTORNEY

Patented Oct. 6, 1942

2,298,189

UNITED STATES PATENT OFFICE 2,298,189

ELECTRIC MOTOR

George C. Armstrong, Forest Hills, Pa., assignor to Westinghouse Electric & Manufacturing Company, East Pittsburgh, Pa., a corporation of Pennsylvania Application July 19, 1940, Serial No. 346,255

16 Claims. (Cl. 172—126)

My invention relates to electromagnetic rotary devices and is an improvement over the device described in my Patent No. 2,111,550, issued March 22, 1938. Heretofore in electromagnetic rotary devices rotation has been produced directly by electromagnetic action. According to my invention, as described in my aforesaid patent, I have obtained rotation by an action partly electromagnetic and partly the result of friction.

Hysteresis plays an important part in the action, but the invention is not to be confounded with the so-called hysteresis motor because it does not require a rotating field. A periodic flux, oblique to the surface on which motion is to be produced, and including a reversal in its period is all that is required.

It is an object of my invention to produce rotation in the way just described and to use it for any desired purpose such as the closing of contacts, the driving of toys or other light machinery, the control of latching devices on relays and the like. In the latter use, my invention provides a very convenient time-delay device.

It is a further object of my invention to provide an inexpensive and easily manufactured electric controlling device for a prime mover.

Another object of this invention is to provide a low speed motor having a high torque.

A further object of my invention is to provide a self-starting motor having a high torque particularly at starting.

It is a further object of my invention to cause an armature to have a motion both of translation and of rotation relative to a magnetic pole-face.

It is a further object of my invention to provide an electric driving device capable of being contained in a small space.

It is a further object of my invention to provide an electric driving device easily maintained in order and requiring little attention.

Other objects of my invention and details of construction, modifications and applications will be evident from the following description and accompanying drawings, in which:

Figure 1 is a front view partly in cross section and partly in side elevation of a device embodying the principles of my invention;

Fig. 2 is a side view of the device shown in Fig. 1;

Fig. 3 is a front view of a lamination used in the construction of the device shown in Fig. 1;

Fig. 4 is a front view of a modification of a lamination and spring useable in Fig. 1;

Figs. 5 and 6 are top and side views, respectively, of the pole face 3 shown in Fig. 1.

Figure 7:
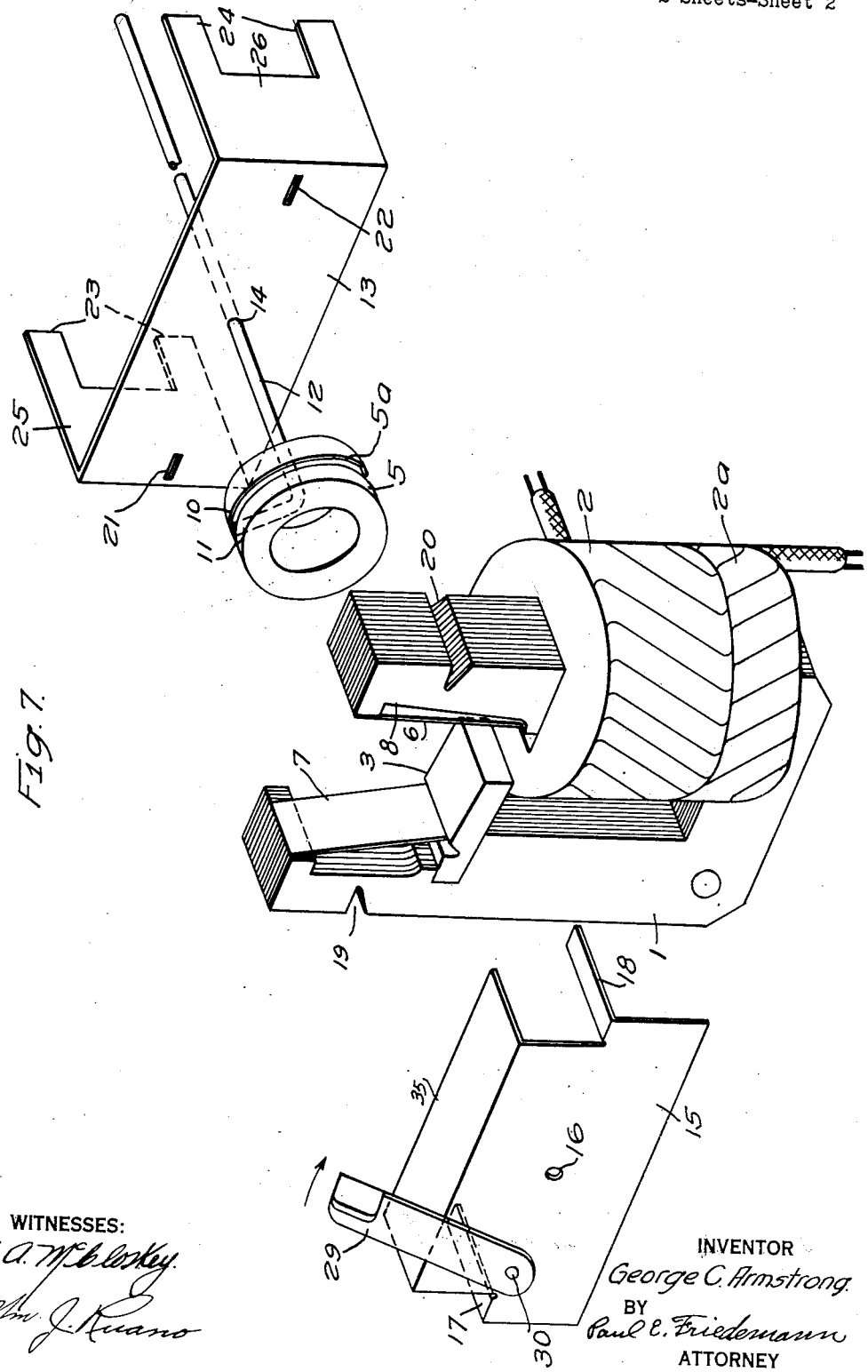
Fig. 7 is an exploded perspective view of the parts shown in Fig. 1 with a modified coil winding for providing a transformer.

In Figure 1 a magnetic circuit 1 is supplied with a coil 2 for energizing it with periodic flux. The circuit contains an air gap having a pole face 3 and a pole 4. Preferably, the pole 4 has a surface less than at right angles to the pole face 3. A cylindrical rotor 5 rests on the pole face 3. Such rotor may have one or more circumferential grooves such as 5a (see Fig. 7) to reduce heating such as caused by eddy currents. It is biased away from the pole 4 by a spring 6. As shown, this spring is loosely mounted upon a shoulder portion of the body of the magnetic circuit, and the spring may or may not be of magnetic material.

A return spring 7 is supported, at the lower end thereof, in a groove formed in pole face 3 and at the upper end by the pole face portion 8. This return spring 7 is weaker than the spring 6 and aids substantially in centering the rotor 5 in a manner to be more responsive to the magnetic influence of the magnetic flux and at the same time eliminates noise and excessive vibrations which would otherwise be caused by the intermittent striking of the rotor against the pole face 8. An oil wick 9 is used for lubricating the rotor surface.

I have found that for best results, that is, for developing the highest torque and rotational movement of the rotor 1, pole face 3 should preferably be disposed at an angle less than 90° with respect to pole face 4. The magnetic core can be built up in a well known manner by providing a plurality of laminations, such as shown in Fig. 3 and thereafter providing a magnetic piece 3, such as shown in Figs. 5 and 6, and placing such piece in a slot of the lamination as indicated in Fig. 1. However, as an alternative way of building up the core, laminations such as shown in Fig. 4, may be assembled together. In order to get coil 2 around one leg of such lamination, it will be necessary to flex the legs of the laminations apart, that is, so that the legs will not be in the same plane. By the construction as shown in Fig. 4, it will be obvious that the additional pole piece 3 will be entirely unnecessary. Fig. 4 also shows a modified spring 6' having a bent portion 27 normally at an acute angle with respect to the main spring portion, and which fits into a corresponding groove in the pole face. By springing portion 27 so as to enlarge the acute angle, the main spring portion is firmly pressed against shoulder 28 thus eliminating vibration and giving quieter operation.

The operation of the motor has been described in detail in my aforementioned earlier issued patent. However, in order to make the present description complete, the operation of the device will be briefly described as follows:

When the coil or coils upon the magnetic circuit are energized, periodic flux occurs between the pole faces 3 and 4 under the influence of this flux and of the spring 6, the cylinder 5 will move both to and fro and rotate. At the beginning of the movement, various transients occur, but when the motion has become steady, the member 5 will be approximately in its extreme right-hand position at the time the flux is exerting the greatest pull. This is in accordance with the usual action of spring biased bodies oscillating steadily in a sinusoidal magnetic field.

As the body 5 moves from its extreme right-hand position, friction between it and the pole piece 3 causes it to rotate. It will reach the extreme left-hand position at or about the time that the flux in the gap 3—4 falls to zero. This will be the moment of reversal of magnetization in the core 1, but it will not be the time of reversal of magnetization in the body 5 because the hysteresis of the material of the cylinder 5 requires that the magnetomotive force acting at the point of contact shall reverse and then rise to a sufficient intensity to provide the coercive force needed to reverse the magnetism of the cylinder.

At the moment after reversal of magnetization of the pole 3 it will have the same polarity as the adjacent portions of cylinder 5. There will, therefore, be some repulsion between them. Consequently, the cylinder 5 will move under the influence of the spring 6 without being caused to roll. That is, it will slide toward the right during at least part of the time it is moved by the spring. Also during the motion toward the left, the cylinder will have acquired a certain rotational momentum. This will cause its rotation to persist during the motion toward the right until its magnetism has been reversed and there is again attraction between it and the end of the pole face 3.

The cylinder arrives at its right-hand position either with no rotation at that instant or with a reduced rotational velocity. The result is an accumulation of rotational movement in the counterclockwise direction. This movement may be used to drive any apparatus connected to the cylinder, the connection being afforded in any suitable way.

In order to provide a universal connection for the drive shaft of the motor a radial groove 10 is provided in rotor 5 through which may extend a hook portion 11 of a rod 12 (see Fig. 7). A piece of non-magnetic sheet metal 13 is provided with a bearing or hole 14 through which rod 12 extends and upon which it is supported. Another piece of non-magnetic sheet metal 15 is provided having another hole 16 which may be used in the event that it is desired to have rod 12 extend towards the left instead of towards the right. Sheet metal 15 is provided with a pair of tabs 17 and 18 which extend along grooves 19 and 20 of the magnetic core and the ends of which extend through the holes 21 and 22 in sheet metal piece 13 and are then crimped so as to rigidly hold the sheet metal pieces on the magnetic core. Tabs 23 and 24 are provided on sheet metal piece 23 which may be inserted through any holes on any other structure (not shown) to which it may be desired to rigidly connect the motor.

It will be readily apparent that instead of striking out tabs 17 and 18 in a horizontal plane, they might be struck out in a vertical plane so as to fit into holes (not shown) provided in the side portions 25 and 26 of the sheet metal piece 13 without the necessity of making grooves 19 and 20 in the core.

It will thus be seen that I have provided a very simple and inexpensive bearing structure free of rivets or any other expensive supporting means and that I have provided an exceedingly simple universal connection and drive shaft for the rotor comprising only a single rod, thereby making a very inexpensive but practical operating device for operating small toys, switches, and the like.

In order to provide a speed adjustment for the motor a sheet steel adjusting lever 29 is pivoted onto sheet metal 15 by a rivet 30. When such lever is moved in the direction of the arrow to a position in which it bridges the magnetic field, it reduces the flux acting on the rotor and causes the motor to operate at reduced speed.

Since full voltage (usually 110 volts), is applied to coil 2, it is desirable to wind another coil such as 2a (see Fig. 7) which acts as a secondary of a transformer and from which a small voltage may be obtained, in the order of a few volts, which is useful to operate small lights such as used with toys.

As will be clearly apparent from the showings of Figs. 1, 2, and 7, the member 15 is provided with an inwardly projecting part 35 which, in effect, forms a cap member for the stator 1 when the member 15 is secured in position by means of the lugs 17 and 18. With the cap member 15 in position, as shown in Figs. 1 and 2, it is to be noted that the underside of the part 35 abuts against the upper ends of the springs 6 and 7 and thus operates to hold such springs in position and prevent endwise movement of the same when the rotor 5 is caused to rotate and slide with respect to the pole face 3. In this manner, a simple and inexpensive support for the springs 6 and 7 is provided which is not likely to become loose or worn through use. It will be obvious that the part 35 could be formed integrally with the stator 1, and in such case it would merely be necessary to slide the springs 6 and 7 laterally into the position shown in Fig. 1.

I am, of course, aware that others, particularly after having had the benefit of the teachings of my invention, may devise other devices embodying my invention, and I, therefore, do not wish to be limited to the specific showings made in the drawings and the descriptive disclosure hereinbefore made, but wish to be limited only by the scope of the appended claims and such prior art that may be pertinent.

I claim as my invention:

1. An electric motor comprising in combination, a magnetic stator core having a pair of pole faces, means for periodically energizing said core, a rotor having a circular surface which rests on and is supported by one of said pole faces and which is adapted to roll and slide on the said one pole face under the influence of said energizing means, both of said pole faces having projection means, a flat spring loosely supported on each of said pole faces and which is loosely supported by said projection means, which spring is adapted to bias said rotor towards the other of said pole faces, one of said flat springs being substantially stiffer than the other.

2. An electric motor comprising in combination, a magnetic stator core having a pair of pole faces, a winding mounted on said core, a source of alternating current potential for energizing said core, a hollow cylindrical rotor which rests on and is supported by one of said pole faces and which is adapted to roll and slide on the said one pole face, said rotor having a radial hole therethrough, a unitary wire having a portion bent substantially at right angles to the main portion thereof, said first mentioned portion adapted to fit in said radial hole, and bearing means for supporting said main wire portion.

3. An electric motor comprising in combination, a magnetic stator core having a pair of pole faces, a winding mounted on said core, a source of alternating current potential for energizing said core, a hollow cylindrical rotor which rests on and is supported by one of said pole faces and which is adapted to roll and slide on the said one pole face, said rotor having a radial hole therethrough, a unitary wire having a portion bent substantially at right angles to the main portion thereof, said first-mentioned portion adapted to fit in said radial hole, and bearing means for supporting said main wire portion, said bearing means comprising perforated sheet metal means having strips which extend along grooved portions of said stator, which strips closely embrace the said stator and are supported thereby.

4. An electric motor comprising in combination, a magnetic stator core having a pair of pole faces, a winding mounted on said core, a source of alternating current potential for energizing said core, a hollow cylindrical rotor which rests on and is supported by one of said pole faces and which is adapted to roll and slide on the said one pole face, said rotor having a radial hole therethrough, a unitary wire having a portion bent substantially at right angles to the main portion thereof, said first-mentioned portion adapted to fit in said radial hole, and bearing means for supporting said main wire portion, said bearing means comprising a pair of parallel disposed pieces of sheet metal, at least one of which has a hole to accommodate said main wire portion, one of said pieces of sheet metal having strips which extend along peripheral grooved portions of said stator core and extend through perforations of said other piece of sheet metal having the penetrating portions bent so as to clamp said pieces of sheet metal onto said stator core.

5. An electric motor comprising in combination, a magnetic stator core having a pair of pole faces, means for periodically energizing said core, a rotor having a circular surface which rests on and is supported by one of said pole faces and which is adapted to roll and slide on the said one pole face under the influence of said energizing means, said rolling and sliding surface of the pole face being at an angle of less than 90° with respect to the surface of the other of said pole faces.

6. An electric motor comprising in combination, a magnetic stator core having a pair of pole faces, means for periodically energizing said core, a rotor having a circular surface which rests on and is supported by one of said pole faces and which is adapted to roll and slide on the said one pole face under the influence of said energizing means, said rolling and sliding surface of the pole face being at an angle of less than 90° with respect to the surface of the other of said pole faces, said stator core comprising a plurality of substantially U-shaped laminations which have an inwardly extending projection on one of the legs of the U which projection has an upper edge upon which rolling and sliding of said rotor takes place and which is disposed at an acute angle with respect to the other leg of the U-shaped lamination.

7. An electric motor comprising in combination, a magnetic stator core having a pair of pole faces, means for periodically energizing said core, a rotor having a circular surface which rests on and is supported by one of said pole faces and which is adapted to roll and slide on the said one pole face under the influence of said energizing means, said rolling and sliding surface of the pole face being at an angle of less than 90° with respect to the surface of the other of said pole faces, said stator core comprising a plurality of substantially U-shaped laminations having a slot in one of its legs, a separate metallic piece which fits in said slot and has an upper surface for accommodating rolling and sliding of said rotor which upper surface is disposed at an acute angle with respect to the surface of the other pole face.

8. An electric motor comprising in combination, a magnetic stator core having a pair of pole faces, means for periodically energizing said core, a rotor having a circular surface which rests on and is supported by one of said pole faces and which is adapted to roll and slide on the said one pole face under the influence of said energizing means, said rolling and sliding surface of the pole face being at an angle of less than 90° with respect to the surface of the other of said pole faces, said stator core comprising a plurality of substantially U-shaped laminations having a slot in one of its legs, a separate metallic piece which fits in said slot and has an upper surface for accommodating rolling and sliding of said rotor which upper surface is disposed at an acute angle with respect to the surface of the other pole face, a slot on said upper surface, and a flat spring having an end fitting on said slot and the other end supported against its adjoining pole face so as to bias said rotor towards the other pole face.

9. An electric motor comprising in combination, a magnetic stator core having a pair of pole faces, means for periodically energizing said core, a rotor having a circular surface which rests on and is supported by one of said pole faces and which is adapted to roll and slide on the said one pole face under the influence of said energizing means, said rolling and sliding surfaces of the pole face being at an angle of less than 90° with respect to the surface of the other of said pole faces, said stator core comprising a plurality of substantially U-shaped laminations having a slot in one of its legs, a separate metallic piece which fits in said slot and has an upper surface for accommodating rolling and sliding of said rotor which upper surface is disposed at an acute angle with respect to the surface of the other pole face, a slot on said upper surface, and a flat spring having an end fitting on said slot and the other end supported against its adjoining pole face so as to bias said rotor towards the other pole face.

10. An electric motor comprising in combination, a magnetic stator core having a pair of pole faces, means for periodically energizing said core, a rotor having a circular surface which rests on and is supported by one of said pole faces and which is adapted to roll and slide on the said one pole face under the influence of said energizing means, a flat spring which is loosely mounted on and spaced from a portion of the surface of said other pole face and which is adapted to bias said rotor towards said first-mentioned pole face, and speed adjusting means comprising an adjustable lever extendible longitudinally of said pole faces for selectively bridging a portion of the magnetic flux normally passing across said pole faces.

11. An electric motor comprising in combination, a magnetic stator core having a pair of pole faces, a rotor having a circular surface which rests on and is supported by one of said pole faces, and speed adjusting means comprising an adjustable lever extendible longitudinally of said pole faces for selectively bridging a portion of the magnetic flux normally passing across said pole faces.

12. An electric motor comprising in combination, a magnetic stator core having a pair of pole faces, a rotor having a circular surface which rests on and is supported by one of said pole faces, and a flat leaf spring, said other pole face having a portion projecting outwardly therefrom for receiving one end of said spring to provide a support therefor, said other pole face further having a part engageable with the other end of said spring for preventing endwise movement of the same out of engagement with said projecting portion, said spring being engageable at a point intermediate the ends with the circular surface of said rotor to bias the same toward said first named pole surface.

13. An electric motor comprising in combination, a magnetic stator core having a pair of pole faces, a rotor having a circular surface which rests on and is supported by one of said pole faces, a flat leaf spring, said other pole face having a portion projecting outwardly therefrom for receiving one end of said spring to provide a support therefor, said other pole face further having a cap member engageable with the other end of said spring for holding the same in position on said projecting portion, said spring being engageable at a point intermediate its ends with said rotor for biasing the same toward said first named pole surface, and means for securing said cap member in position on said other pole surface.

14. An electric motor comprising in combination, a magnetic stator core having a pair of pole faces, a rotor having a circular surface which rests on and is supported by one of said pole faces, and a flat leaf spring associated with each of said pole faces, each of said pole faces having a portion for receiving one end of the spring associated therewith to form a support therefor, each of said faces further having a part engageable with the other end of the spring associated therewith for holding such spring in position in said portion, said springs being resiliently engageable at points intermediate the respective ends thereof with opposite sides of said rotor.

15. An electric motor comprising in combination, a magnetic stator core having a pair of pole faces, a rotor having a circular surface which rests on and is supported by one of said pole faces, and a flat leaf spring associated with each of said pole faces, each of said pole faces having a portion for receiving one end of the spring associated therewith to form a support therefor, a cap member for said stator engageable with the other ends of said springs for holding the same in position on said pole face supporting portions, said springs being resiliently engageable at points intermediate the respective ends thereof with opposite sides of the rotor, and means for securing said cap member in position on said stator.

16. An electric motor comprising in combination, a magnetic stator core having a pair of pole faces, a rotor having a circular surface which rests on and is supported by one of said pole faces, and a flat spring having a hooked end, said other pole face having a slot in which said hooked end is receivable to furnish a support for said spring, said other pole face further having a projecting part against which the other end of said spring is adapted to abut, said spring being engageable at a point intermediate its ends with said rotor to bias the same toward said first named pole surface.

GEORGE C. ARMSTRONG.